(12) United States Patent
Shima et al.

(10) Patent No.: US 11,542,885 B2
(45) Date of Patent: Jan. 3, 2023

(54) LOAD DRIVE CIRCUIT AND LOAD DRIVE SYSTEM

(71) Applicant: Hitachi Automotive Systems, Ltd., Hitachinaka (JP)

(72) Inventors: Yasuo Shima, Hitachinaka (JP); Yoshihisa Fujii, Hitachinaka (JP); Takeo Yamashita, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 161 days.

(21) Appl. No.: 17/052,888

(22) PCT Filed: Jun. 11, 2019

(86) PCT No.: PCT/JP2019/023016
§ 371 (c)(1),
(2) Date: Nov. 4, 2020

(87) PCT Pub. No.: WO2020/008816
PCT Pub. Date: Jan. 9, 2020

(65) Prior Publication Data
US 2021/0131373 A1    May 6, 2021

(30) Foreign Application Priority Data
Jul. 3, 2018    (JP) .............................. JP2018-126706

(51) Int. Cl.
*F02D 41/34*        (2006.01)
*F02D 41/22*        (2006.01)
(Continued)

(52) U.S. Cl.
CPC ............. *F02D 41/34* (2013.01); *F02D 41/22* (2013.01); *F02M 51/00* (2013.01); *F02M 63/00* (2013.01)

(58) Field of Classification Search
CPC ......... F02D 41/34; F02D 41/22; F02M 51/00; F02M 63/00
(Continued)

(56) References Cited

U.S. PATENT DOCUMENTS 4,437,342 A * 3/1984 Hosaka ................. F02D 41/266
  73/114.54
4,590,908 A * 5/1986 Yoshinaga ........... F02M 59/366
  123/357

(Continued)

FOREIGN PATENT DOCUMENTS

| JP | 2006-220039 A | 8/2006 |
| JP | 2013-036344 A | 2/2013 |
| JP | 2013-204442 A | 10/2013 |

OTHER PUBLICATIONS

International Search Report with English translation and Written Opinion issued in corresponding application No. PCT/JP2019/023016 dated Sep. 24, 2019.

*Primary Examiner* — Logan M Kraft
*Assistant Examiner* — John D Bailey
(74) *Attorney, Agent, or Firm* — Foley & Lardner LLP

(57) ABSTRACT

With a simple configuration, responsiveness between an electronic control unit and a load drive circuit is monitored without deteriorating characteristics of the load drive circuit. The load drive circuit according to the present invention diagnoses an abnormality in responsiveness of a switch element that drives a load based on a drive command of the switch element and a signal at an output terminal of the switch element.

14 Claims, 8 Drawing Sheets

(51) Int. Cl.
*F02M 51/00* (2006.01)
*F02M 63/00* (2006.01)

(58) Field of Classification Search
USPC ............................................... 123/294
See application file for complete search history.

(56) References Cited

U.S. PATENT DOCUMENTS

| | | | | |
|---|---|---|---|---|
| 5,126,943 | A * | 6/1992 | Nakaniwa | F02D 41/248 123/690 |
| 6,058,348 | A * | 5/2000 | Ohyama | F01L 13/0036 123/294 |
| 6,192,856 | B1 * | 2/2001 | Shioi | F02D 41/408 123/506 |
| 10,778,210 | B2 * | 9/2020 | Kamiya | H03K 17/687 |
| 2005/0187681 | A1 * | 8/2005 | Suzuki | F02D 41/26 701/1 |
| 2007/0023011 | A1 * | 2/2007 | Ohno | F02D 41/266 123/479 |
| 2008/0184968 | A1 * | 8/2008 | Matsuura | F02D 41/20 123/490 |
| 2014/0067233 | A1 * | 3/2014 | Nishida | F02D 41/30 701/103 |
| 2016/0138511 | A1 * | 5/2016 | Toyohara | F02D 41/3809 123/478 |
| 2016/0160783 | A1 * | 6/2016 | Fujita | F02D 41/221 701/103 |
| 2016/0177855 | A1 * | 6/2016 | Kusakabe | F02M 51/0685 123/490 |
| 2016/0237937 | A1 * | 8/2016 | Kusakabe | F02D 41/247 |
| 2017/0159634 | A1 * | 6/2017 | Fujimoto | F02D 41/0002 |
| 2017/0218876 | A1 * | 8/2017 | Kusakabe | F02D 41/34 |
| 2018/0010545 | A1 * | 1/2018 | Mukaihara | F02D 41/402 |
| 2019/0203687 | A1 * | 7/2019 | Yanoto | F02D 41/40 |
| 2020/0056570 | A1 * | 2/2020 | Sugiyama | F02D 41/22 |
| 2021/0123393 | A1 * | 4/2021 | Itaba | F02M 51/06 |

* cited by examiner

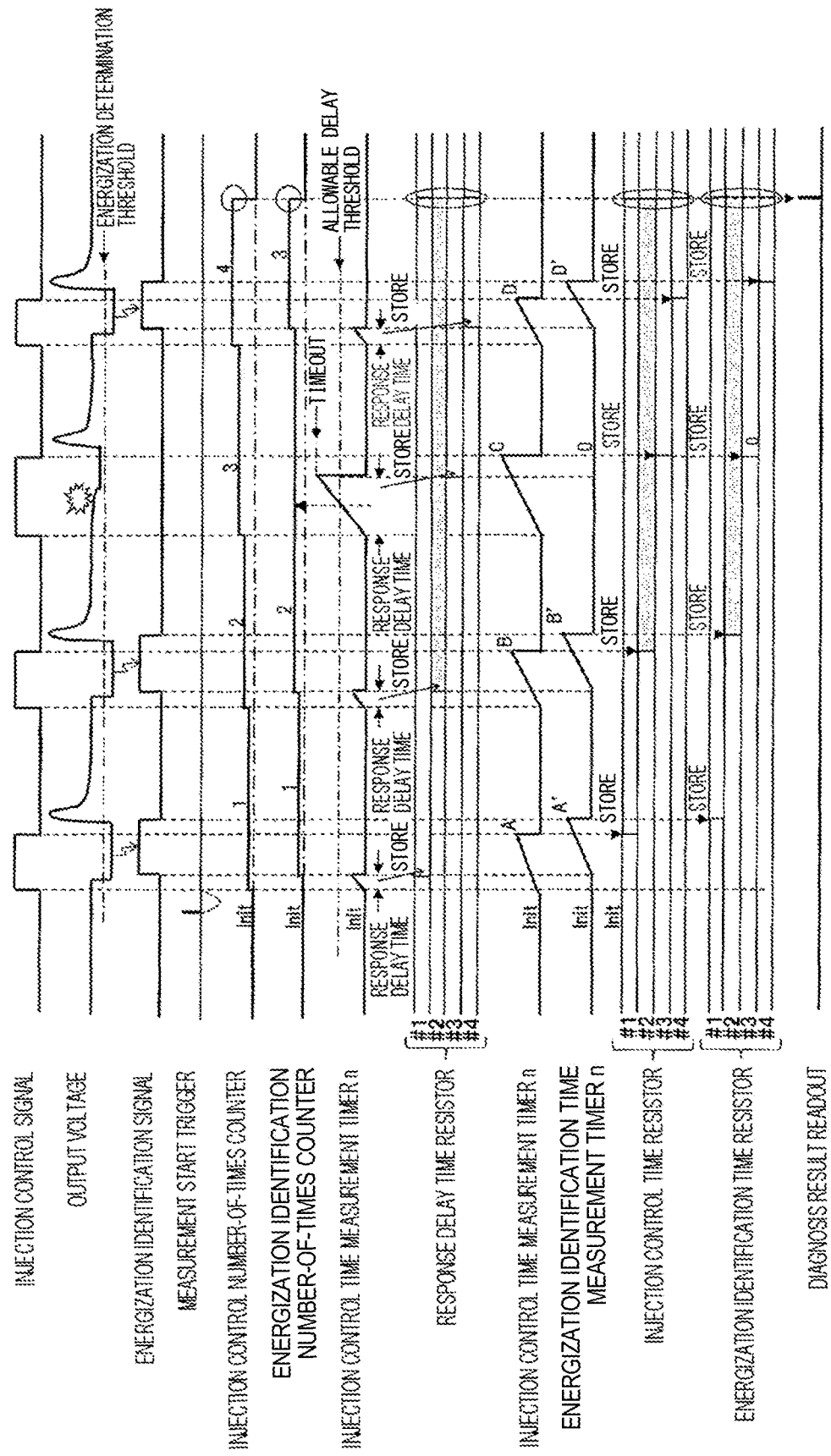

LOAD DRIVE CIRCUIT AND LOAD DRIVE SYSTEM

TECHNICAL FIELD

The present invention relates to a load drive circuit: that drives an electric load.

BACKGROUND ART

In a fuel injection control device for an internal combustion engine, a drive device (load drive circuit) includes a switch for controlling energization of a fuel injection valve, and controls the switch according to a fuel injection command which is computed by the microcomputer, thereby controlling the energization of the fuel injection valve. The fuel injection valve is opened due to the energization of the fuel injection valve to inject fuel.

In recent years, as a countermeasure for improving an exhausting performance of the internal combustion engine, a multi-stage injection control in which the fuel is injected at least a plurality of times in one combustion cycle has been applied. In the multi-stage injection control, the fuel injection valve is opened plural times during one combustion cycle. In this case, accuracy of injection timing or injection amount has been required as compared with the conventional fuel injection. Therefore, the fuel injection control device is required to monitor whether or not the drive device correctly responds to each fuel injection command.

The following PTL 1 discloses a fuel injection control device in which an electronic control unit that calculates a fuel injection amount and a drive device that drives a fuel injection valve are provided separately. In PTL 1, the electronic control unit energizes the fuel injection valve in response to a fuel control signal based on a fuel injection command which is computed by the electronic control unit. The fuel injection control device detects a drive current for the drive device to energize the fuel injection valve, and outputs the detection signal to the electronic control unit. The electronic control unit compares the fuel injection command or the injection control signal based on the fuel injection command with the detection signal, and determines, based on the comparison result, whether or not a drive circuit correctly outputs a drive signal to the fuel injection valve corresponding to the fuel injection command.

CITATION LIST

Patent Literature

PTL 1: JP 2013-036344 A

SUMMARY OF INVENTION

Technical Problem

The invention described in PTL 1 is to check whether or not an output current for driving the fuel injection valve of the drive circuit is normal, and is not to monitor an operation of the fuel injection valve itself or a valve-opening time. Further, in order to detect the output current of the drive device, a current detection resistor is serially inserted into an output stage of the drive device. Therefore, an output impedance is high and the energy loss is large as compared with a case where the current detection resistor is not provided. Since the detection signal of the output current is required for each fuel injection valve to be driven, the electronic control unit and the drive device each require the same number of input/output terminals as the fuel injection valve. Therefore, an additional cost for providing a new input/output terminal is required.

The present invention has been made in view of the above problems, an object of the present invention is to monitor responsiveness between the electronic control unit and the load drive circuit, without deteriorating characteristics of the load drive circuit, with a simple configuration.

Solution to Problem

A load drive circuit according to the present invention diagnoses an abnormality in responsiveness of a switch element that drives a load based on a drive command of the switch element and a signal at an output terminal of the switch element.

Advantageous Effects of Invention

According to the load drive circuit of the present invention, the responsiveness of the output of the load drive circuit with respect to the fuel injection command calculated by the electronic control unit can be diagnosed with a simple configuration. Therefore, it is possible to appropriately monitor the operation of a fuel injection control device that leads to an abnormality in the fuel injection timing or the fuel injection time, even in the multi-stage injection control that requires higher accuracy than in the related art. Problems, configurations, and advantageous effects about the present invention other than those described above will be explicitly shown by the descriptions of the following embodiments.

BRIEF DESCRIPTION OF DRAWINGS

FIG. 8 is another example of a time chart explaining a temporal change in a signal value representing a result determined by the signal measurement/comparison determination circuit 90.

DESCRIPTION OF EMBODIMENTS

First Embodiment

Figure 1:
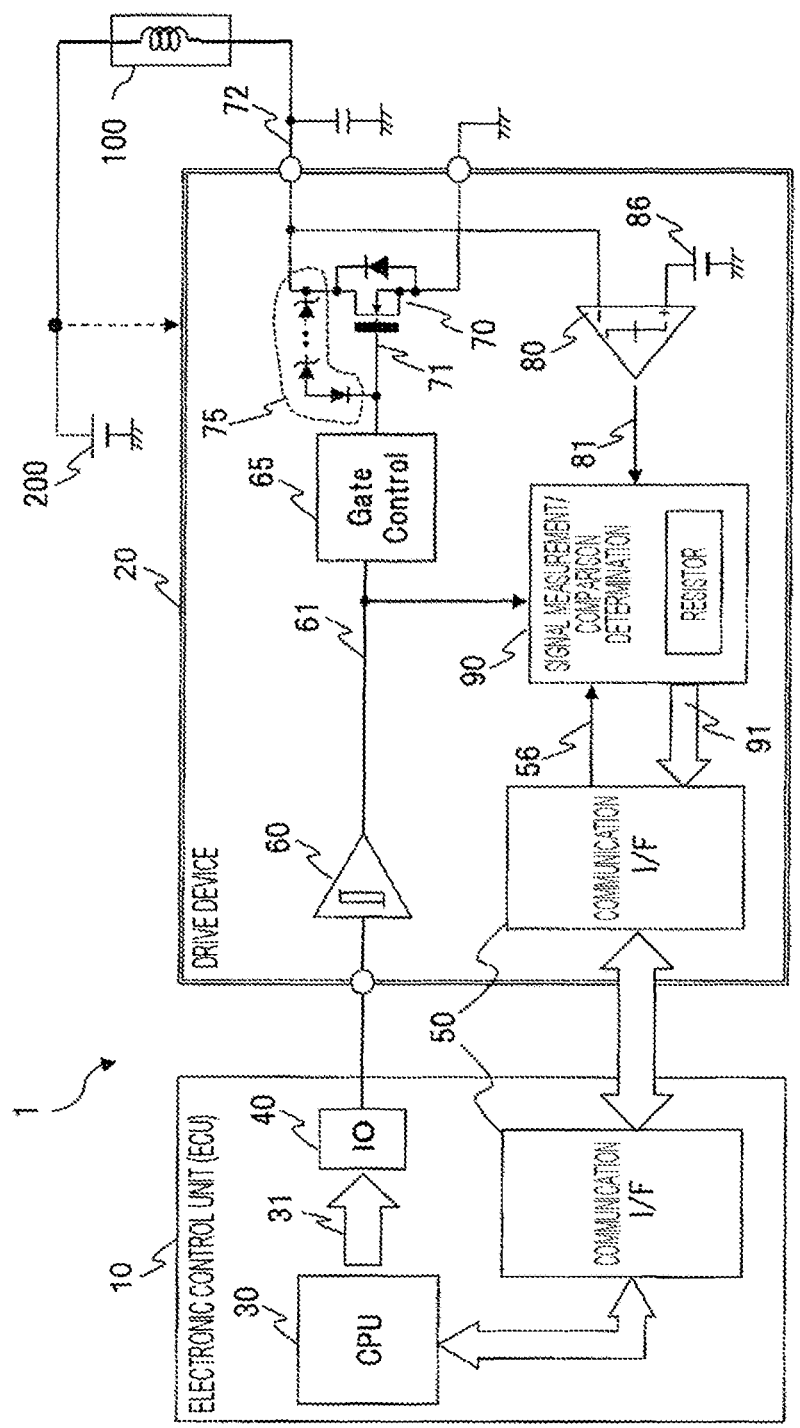
FIG. 1 is a configuration diagram of a load drive system 1 according to a first embodiment.

FIG. 1 is a configuration diagram of a load drive system 1 according to a first embodiment of the present invention. The load drive system 1 is a system that drives and controls a fuel injection valve 100 injecting fuel into an internal combustion engine. The load drive system 1 includes an electronic control unit (ECU) 10 and a drive device (load drive circuit) 20.

The drive device 20 is a device that drives and controls an electric load (fuel injection valve 100) by supplying a drive current to the electric load. The output 72 of the drive device 20 is connected to the fuel injection valve 100, and the fuel injection valve 100 is controlled to be opened and closed according to the current of the output 72.

The electronic control unit 10 holds a fuel injection control program in the memory (not illustrated). A central processing unit (CPU) 30 executes the program to calculate a combustion injection amount and a timing thereof based on an operating state or operating situation of the internal combustion engine. The CPU 30 generates an injection command 31 for each fuel injection valve 100, and outputs the generated injection command 31 from an IO port 40 to the drive device 20. The injection command 31 may be output to the drive device 20 through a communication interface 50 that exchanges setting or status information between the electronic control unit 10 and the drive device 20.

An input signal determination circuit 60 receives the injection command 31 from the electronic control unit 10, and encodes the received injection command 31 into an injection control signal 61 at a high level during injection, and at a low level during cut-off, for example. A gate input 71 of a switch element 70 is controlled so that the switch element 70 (for example, metal oxide semiconductor field effect transistor (MOSFET)) is turned on when the injection control signal 61 is at a high level, and the switch element 70 is turned off when the injection control signal 61 is at a low level, such that the gate control circuit 65 controls energization and cut-off of the fuel injection valve 100.

A comparator 80 compares a voltage level of the output 72 with a predetermined energization determination threshold voltage 86 and determines that the switch element 70 is turned on (energized) when the voltage level is lower than the energization determination threshold voltage 86, and the switch element 70 is turned off (cut oft) when the voltage level is equal to or higher than the energization determination threshold voltage 86, thereby identifying an operating state of the drive device 20. Waveform examples of the voltage level and a current level of the output 72 will be described below. The comparator 80 outputs the determination result as an energization identification signal 81. The energization identification signal 81 is, for example, a signal indicating a high level when it is determined that the switch element 70 is turned on (energized), and a signal indicating a low level when it is determined that the switch element 70 is turned off (cut off). Although not illustrated in FIG. 1, filter processing for removing a glitch and the like from the energization identification signal 81 may be performed.

An energization determination threshold voltage 86 can be easily generated by the drive device 20, and may be set to an adequate voltage level so as not to make wrong determination between a lower limit of the voltage level of the output 72 when the switch element 70 is turned off and a upper limit of the voltage level of the output 72 when the switch element 70 is turned on.

The energization identification signal 81 is input to a signal measurement/comparison determination circuit 90 together with the injection control signal 61. The signal measurement/comparison determination circuit 90 determines whether or not the switch element 70 is operated normally (that is, abnormal energization has not occurred) based on the input signal, and outputs the result to the electronic control unit 10 through the communication interface 50.

Figure 2:
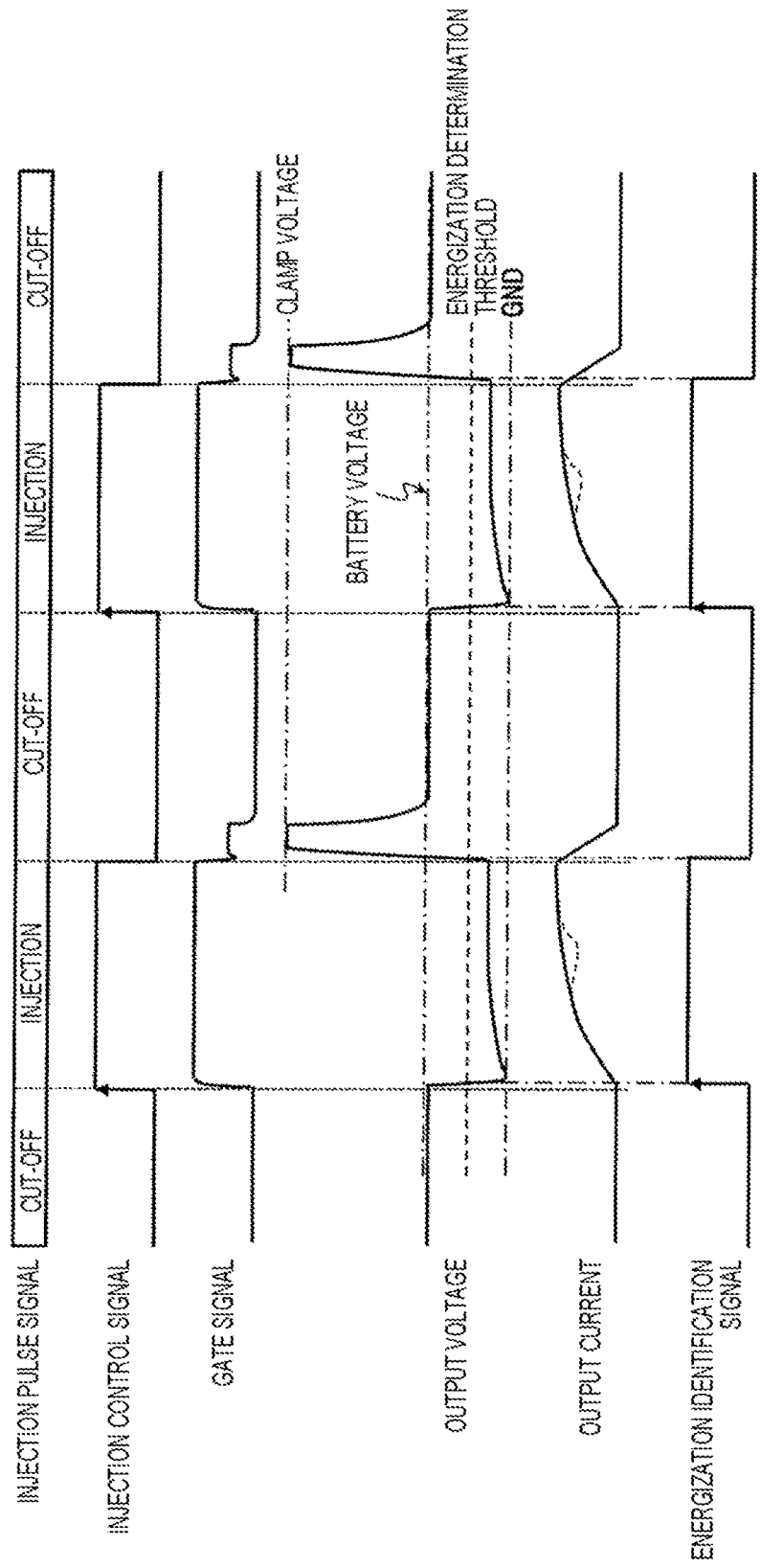
FIG. 2 illustrates a waveform of an output 72 of a drive device 20 when a switch element 70 is controlled to be turned on/off.

FIG. 2 illustrates a waveform of the output 72 of the drive device 20 when the switch element 70 is controlled to be turned on/off. When the switch element 70 is turned off, the output 72 to the fuel injection valve 100 has a voltage level near a voltage level of a DC power supply 200 (battery and the like, or a boosted voltage thereof) connected to an upper electrode side of the fuel injection valve 100. When the switch element 70 is controlled to be turned on, the output 72 has a voltage level near a voltage level of a GND, and energization of the fuel injection valve 100 is started. Since the fuel injection valve 100 has an inductive load, the current flowing through the output 72 is gradually increased, and thus the voltage level of the output 72 is also increased due to ON resistance of the switch element 70. Since the ON resistance of the switch element 70 is usually 0.5 ohm or less, even when a current required to open the fuel injection valve 100, for example, a current of 1 A level flows, the voltage level of the output 72 rises in a range of several hundred mV or lower.

When the switch element 70 is controlled from a turn-on state to a turn-off state, a large surge voltage is generated due to a counter electromotive force caused by the inductive load of the fuel injection valve 100. The surge voltage is clamped to a voltage that does not exceed a device withstand voltage of the switch element 70 by an active clamp circuit 75 between the gate input 71 and the output 72 of the switch element 70, and the clamp voltage causes an increase in voltage of the gate input 71. As a result, the switch element 70 is in the turn-on state for a while, and therefore, the voltage level of the output 72 is decreased from the level clamped by the active clamp circuit 75 to a level close to the voltage level of the DC power supply 200.

Figure 3:
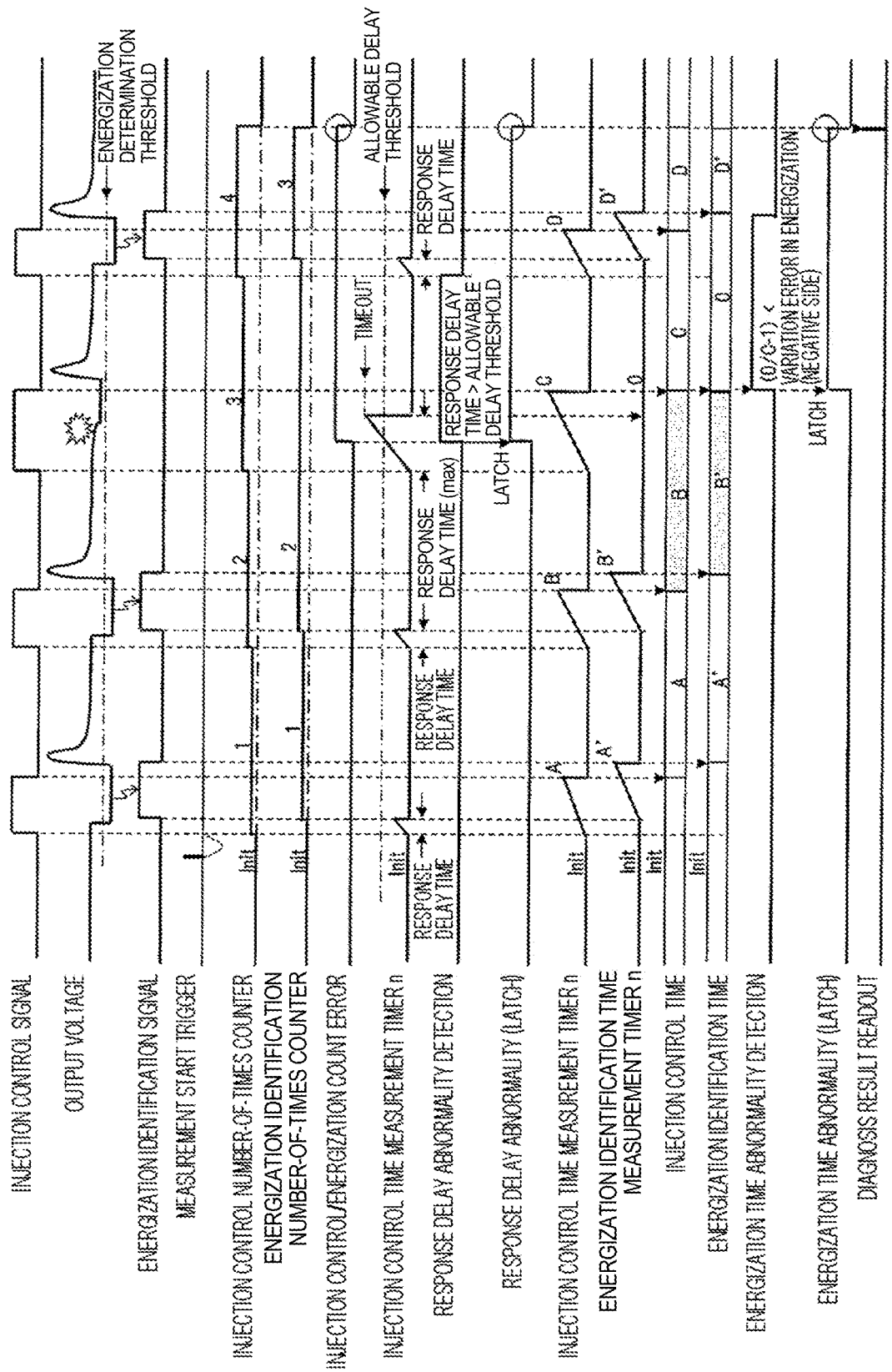
FIG. 3 is a time chart explaining a temporal change in a signal value representing a result determined by the signal measurement/comparison determination circuit 90.

FIG. 3 is a time chart explaining a temporal change in a signal value representing a result determined by the signal measurement/comparison determination circuit 90. The signal measurement/comparison determination circuit 90 determines the followings: (a) a response delay time between the injection control signal and the energization identification signal 81, (b) a difference (or ratio) between an injection control time and an energization time, and (c) a difference between the number of times of injection control and the number of times of energization. The operation of the signal measurement/comparison determination circuit 90 will be described below with reference to FIG. 3.

The electronic control unit 10 transmits a measurement start trigger 56 to the drive device 20 through the communication interface 50 as a measurement start instruction. With the measurement start instruction as a trigger, the electronic control unit 10 and the drive device 20 initialize a measurement function to start measurement.

An injection control signal 51 and the energization identification signal 81 received by the drive device 20 are not necessarily synchronized with a communication frame of the communication interface 50.

The measurement function is initialized in synchronization with an initial rise of the injection control signal 61 (transitions from a low level to a high level) after the measurement start trigger 56 is input, and the measurement is thus started. The measurement start trigger 56 is not necessarily input. For example, after the drive device 20 is activated, the measurement is started at a time at which the injection control signal 61 first rises, and automatic initialization and measurement start may be performed every time the measurement result is transmitted to the electronic control unit 10 through the communication interface 50. The measurement start trigger 56 may be set individually for each measurement item.

When measuring a time such as a response delay time to be described below, a cycle of an operation clock used in the drive device 20 can be used as a reference. For example, a timer circuit that constant-multiplies accuracy in time to be required and uses the result value as the minimum resolution can be used. As fir the maximum measurement time of each measurement item, a value usable to determine an abnormality may be measured after securing a possible range of time at the time of generally using the timer circuit.

The response delay time is a time from a rise of the injection control signal 61 to a rise of the energization identification signal 81 which is a response of the injection control signal 61. The signal measurement/comparison determination circuit 90 compares the measured response delay time with an allowable delay threshold (time window). The allowable delay threshold can be set based on, for example, the worst value of variation in propagation delay from the injection control signal 61 to the energization identification signal 81 inside and outside the drive device 20. If the response delay time is equal to or more than the allowable delay threshold, it is determined that the response delay is abnormal. When the response delay abnormality is detected, an identification flag thereof is stored in a register. The register holds the identification flag until the information is transferred to the electronic control unit 10 through the communication interface 50.

The injection control time is a time from the rise to a fall of the injection control signal 61 (transition from a low level to a high level). The energization time is a time from the rise to a fall of the energization identification signal 81. When the injection control signal 51 and the energization identification signal 81, which transition froth a low level to a high level and transition to a low level again, are set to one pulse; the signal measurement/comparison determination circuit 90 performs the measurement for each pulse. Since one pulse of the energization identification signal 81, which is a response to one pulse of the injection control signal 61, has response delay, the measurement result of the injection control time of the injection control signal 51 is held in the register until the measurement of the energization time of the energization identification signal 81, which is the response, is completed. The signal measurement/comparison determination circuit 90 compares and determines the injection control time and the energization time at a time at which the measurement result of the energization time is obtained.

When the rise of the energization identification signal 81 does not appear due to an abnormality in the drive device 20 even if it exceeds the allowable delay threshold of the response delay, it is considered that the energization does not occur, and the energization time may be set to "0" at a time at which the measurement of the injection control time is completed. When the fall of the energization identification signal 81 does not appear due to fixation of the output 72 of the drive device 20 to a GND level or the like, the measurement of the energization time at the corresponding pulse of the energization identification signal 81 is completed at a time of reaching the maximum measurement time, and the energization time may be set to the maximum measurement time.

The signal measurement/comparison determination circuit 90 calculates an absolute value error, an error in accuracy of ratio, or the like, based on allowable determination criteria of the error between the injection control time and the energization time. The signal measurement/comparison determination circuit 90 determines an abnormality in the energization time for each pulse of the injection control signal using an allowable error amount as a threshold. When an error exceeding the allowable error amount is detected, a flag indicating that the error is detected is stored in the register. The register holds the flag until the information is transferred to the electronic control unit 10 through the communication interface 50.

The number of times of injection control is the number of rises of the injection control signal 61. The number of times of energization is the number of rises of the energization identification signal 81. Generally, the number of times of injection control and the number of times of energization are the same. However, the rise of the energization identification signal 81, which is a response to the rise of the injection control signal 61, has a response delay, and thus the signal measurement/comparison determination circuit 90 waits for the rise of the energization identification signal 81, and compares the number of times of injection control with the number of times of energization. When an error exceeding the allowable error amount is detected, a flag indicating that the error is detected is stored in the register. The register holds the flag until the information is transferred to the electronic control unit 10 through the communication interface 50.

When the rise of the energization identification signal 81 does not appear due to an abnormality in the drive device even if it exceeds the allowable delay threshold of the response delay time, comparison measurement may be performed at a time of reaching the allowable delay threshold. The comparison determination result is not limited to the presence or absence of the error between the number of times of injection control and the number of times of energization. For example, the comparison determination result may be represented by a difference value between the number of times of injection control and the number of times of energization. The maximum count value of the number of times of injection control may be determined based on an access frequency (cycle) of the result measured through the communication interface 50, the number of times of injection to be estimated between accesses, or the like.

The signal measurement/comparison determination circuit 90 transfers the response delay time, the injection control time, the energization time, the number of times of injection control, and the number of times of energization as illustrated in FIG. 3, to the electronic control unit 10 through the communication interface 50 as a comparison determination result 91. The electronic control unit 10 can diagnose the abnormality of the drive device 20 which leads to a failure of a fuel injection amount or injection timing by using the comparison determination result 91. The electronic control unit 10 performs processing, for example, issuing of engine warning and the like, according to the presence or absence of an abnormality and the content thereof.

Figure 4:
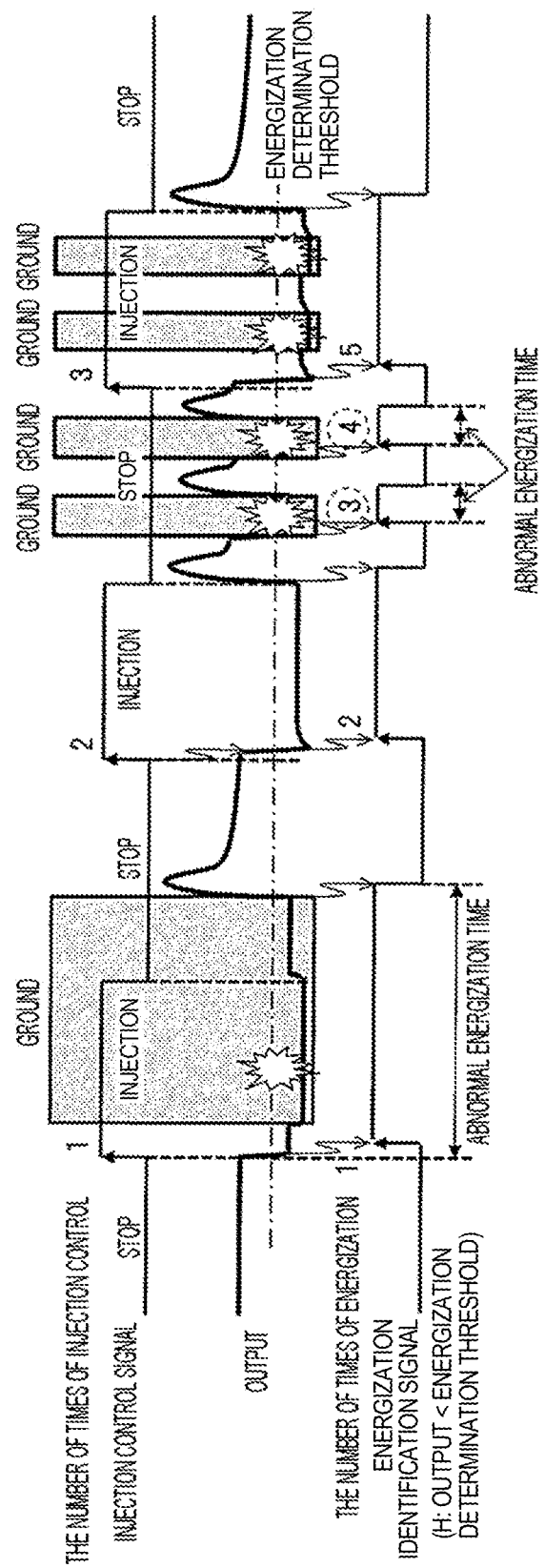
FIG. 4 is a time chart explaining a relationship between a ground fault and energization identification.

FIG. 4 is a time chart explaining a relationship between a ground fault and energization identification. When the fuel injection valve 100 has a ground fault, the voltage level of the output 72 decreases, and thus the voltage level can be compared with the threshold, thereby detecting the occurrence of the ground fault. The ground detection threshold may be the same as the energization determination threshold of the switch element 70. Therefore, the signal measurement/comparison determination circuit 90 can compare the energization identification signal 81 and the energization determination threshold, thereby determining an energization state of the switch element 70 and detecting the occurrence of the ground fault. However, the signal measurement/ comparison determination circuit 90 determines the occurrence of a ground fault in a period in which the injection control signal instructs the switch element 70 to be cut off. Therefore, the signal measurement/comparison determination circuit 90 can separately perform the determination of the energization state of the switch element 70 and the determination of the ground fault.

When it is determined that the ground fault occurs in a period in which the injection control signal 61 instructs the switch element 70 to be cut off, unintended energization occurs. The signal measurement/comparison determination circuit 90 determines such energization as abnormal energization. In an example of FIG. 4, the third and fourth energization is considered as abnormal energization. The signal measurement/comparison determination circuit 90 measures the third and fourth energization times as an abnormal energization time. In an example of FIG. 4, the energization is continuously determined due to the ground fault even after the first energization is completed. Therefore, the entire first energization period is considered as abnormal energization by the signal measurement/comparison determination circuit 90.

First Embodiment: Summary

In the load drive system 1 according to the first embodiment, the drive device 20 determines the energization state of the switch element 70 using the output voltage of the switch element 70, and transmits the determination result to the electronic control unit 10. As the determination is made using the output voltage of the switch element 70, a detection resistor for detecting the output current, or the like is not necessarily provided on the fuel injection valve 100. Thus, a new input terminal is not necessarily provided in the drive device 20 and the electronic control unit 10. Therefore, a fuel injection timing or the fuel injection time can be appropriately monitored with a simple configuration.

In the load drive system 1 according to the first embodiment, since the drive device 20 determines the energization state of the switch element 70, it is not necessary to transmit, for example, the energization identification signal 81 to the electronic control unit 10 in real-time. Therefore, it is not necessary to provide a high-speed communication channel between the electronic control unit 10 and the drive device 20, and thus the existing communication interface 50 can be used. Therefore, a fuel injection timing or the fuel injection time can be appropriately monitored with a simple configuration.

In the load drive system 1 according to the first embodiment, the energization identification signal 81 output from the comparator 80 can be shared for both ground fault detection and energization identification. Therefore, for example, when the drive device 20 has a circuit configuration for detecting the ground fault in advance, the circuit configuration can be used to identify the energization state of the switch element 70. That is, there is an advantage that the object of the present invention can be achieved without greatly changing the design of the drive device 20.

Second Embodiment

Figure 5:
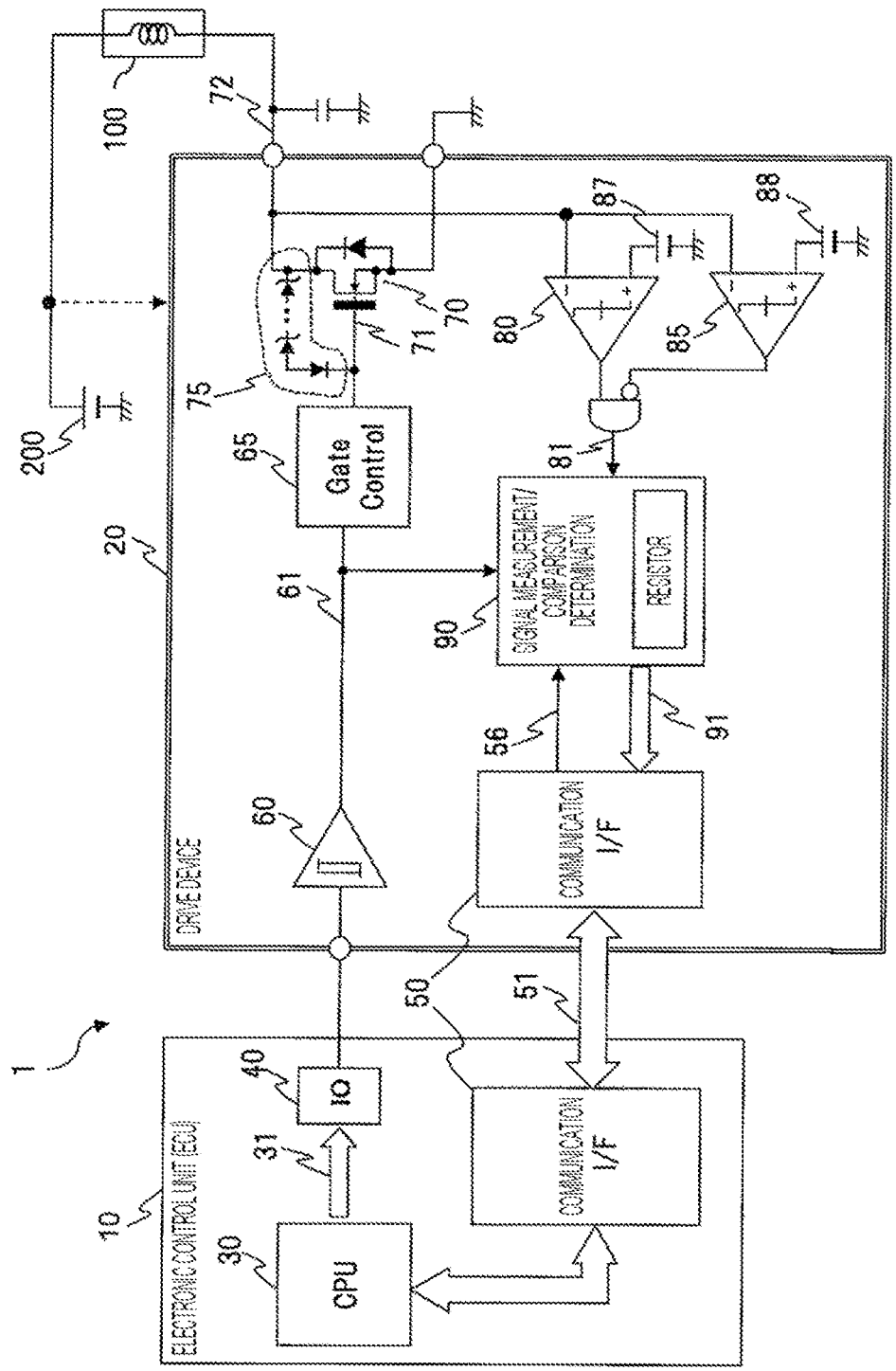
FIG. 5 is a configuration diagram of a load drive system 1 according to a second embodiment.

FIG. 5 is a configuration diagram of a load drive system 1 according to a second embodiment of the present invention.

The load drive system 1 according to the second embodiment includes a comparator 85 in addition to the configuration described in the first embodiment. The comparator 85 compares a voltage level of an output 72 with a second threshold voltage 88 to be described below. An energization identification signal 81 is calculated by performing a logical AND operation on the output of the comparator 80 and the negation of the output of the comparator 85. Determination criteria of the signal measurement/comparison determination circuit 90 will be described below.

Figure 6:
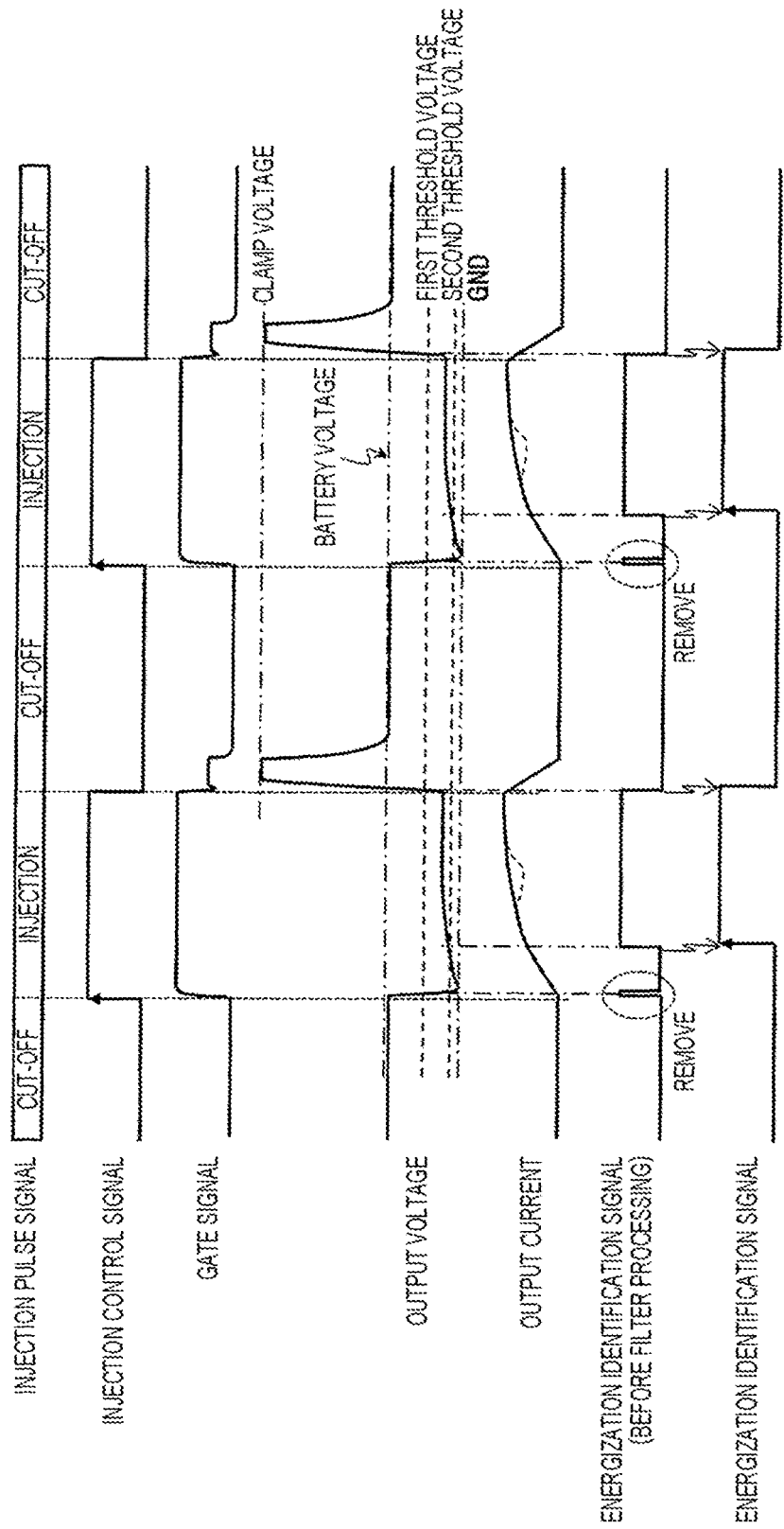
FIG. 6 illustrates a waveform of an output 72 of a drive device 20 when a switch element 70 is controlled to be turned on/off.

FIG. 6 illustrates a waveform of the output 72 of the drive device 20 when the switch element 70 is controlled to be turned on/off. When the comparator 80 controls the switch element 70 to turn on, after the output 72 transitions to the voltage level near a voltage level of a GND, the output 72 is gradually increased due to a current flowing through the output 72. The increasing voltage level is detected, such that turn-on (energization)/off (cut-off) of the switch element 70 is identified.

The comparator 80 determines the turn-on/off of the switch element 70 by comparing the voltage level of the output 72 with a first threshold voltage 87. A comparator 85 determines whether or not the current flows to the switch element 70 by comparing the voltage level of the output 72 with the second threshold voltage 88. When the voltage level of the output 72 is lower than the first threshold voltage 87 and higher than a second threshold voltage 88, the signal measurement/comparison determination circuit 90 determines that the switch element 70 is turned on (energized). When the voltage level of the output 72 is equal to or higher than the first threshold voltage 87 and equal to or lower than the second threshold voltage 88, the signal measurement/comparison determination circuit 90 determines that the switch element 70 is turned off (cut off). The first threshold voltage 87 may have the same voltage level as the energization determination threshold voltage 86 of FIG. 1. As illustrated in FIG. 6, the second threshold voltage 88 is set to an adequate voltage level so as not to have small variation in determination and make wrong determination between an upper limit of the voltage level when the switch element 70 is turned on and a GND level.

According to a method of identifying energization as illustrated in FIG. 6, when the switch element 70 is controlled to be turned on (energized), the output 72 passes through a value ranged from the first threshold voltage 87 to the second threshold voltage 88. That is, while transitioning from the turn-off (cut-off) determination to the turn-on (energization) determination, a period in which the turn-on (energization) is determined occurs once (portion surrounded by dotted circle in FIG. 6). The instantaneous energization identification signal 81 may be removed by a glitch removal filter or the like, or the same processing may be performed by ignoring the instantaneous turn-on determination by the signal measurement/comparison determination circuit 90. For example, the signal measurement/comparison determination circuit 90 may include a filter.

Figure 7:
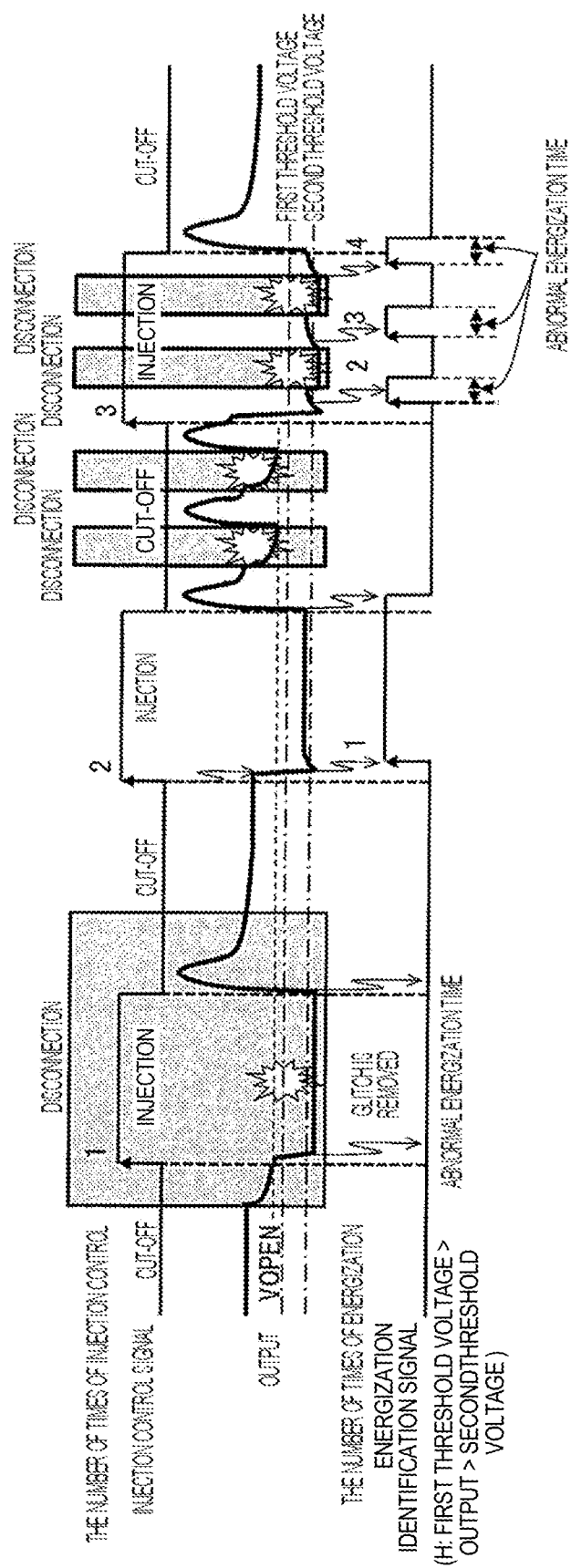
FIG. 7 is a time chart explaining a relationship between a ground fault and energization identification.

FIG. 7 is a time chart explaining a relationship between a ground fault and energization identification. When wiring between the fuel injection valve 100 and the drive device 20 is disconnected, the voltage level of the output 72 decreases, and thus the voltage level can be compared with the threshold, thereby detecting the occurrence of the disconnection. The disconnection detection threshold may be the same as the energization determination threshold of the switch element 70. That is, when the voltage level of the output 72 is lower than the first threshold voltage 87 and higher than the second threshold voltage 88, the signal measurement/comparison determination circuit 90 determines that disconnection occurs. However, the signal measurement/comparison determination circuit 90 determines the occurrence of the disconnection in a period in which the injection control signal 61 instructs the switch element 70 to energize. Therefore, the signal measurement/comparison determination circuit 90 can separately perform the determination of the energization state of the switch element 70 and the determination of the disconnection.

When it is determined that the disconnection occurs in a period in which the injection control signal 61 instructs the switch element 70 to energize, the energization identification signal 81 transitions to a turn-off state in the energization period earlier than an injection control period. The signal measurement/comparison determination circuit 90 determines such energization as abnormal energization when the energization identification signal 81 transitions as such. In an example of FIG. 7, the second to fourth energization is considered as abnormal energization. The signal measurement/comparison determination circuit 90 measures the second to fourth energization times as an abnormal energization time. Further, in an example of FIG. 7, since the disconnection occurs over the entire first injection control period, the energization time may be set to 0. Therefore, the entire first energization period is considered as abnormal energization by the signal measurement/comparison determination circuit 90.

Second Embodiment: Summary

In the load drive system 1 according to the second embodiment, when the voltage level of the output 72 is lower than the first threshold voltage 87 and higher than the second threshold voltage 88, the signal measurement/comparison determination circuit 90 determines that the switch element 70 is in the energization state. By using the second threshold voltage 88 together, it is possible to estimate whether or not the current actually flows through the fuel injection valve 100, in addition to the switch element 70 being in the energization state. As a result, abnormality detection accuracy of the load drive system 1 can be improved.

In the load drive system 1 according to the second embodiment, the energization identification signal 81 can be shared for both disconnection detection and energization identification, the energization identification signal 81 being configured by the output of the comparator 80 and the output of the comparator 85. Therefore, for example, when the drive device 20 has a circuit configuration for detecting the disconnection in advance, the circuit configuration can be used to identify the energization state of the switch element 70.

That is, there is an advantage that the object of the present invention can be achieved without greatly changing the design of the drive device 20.

Third Embodiment

FIG. 8 is another example of a time chart explaining a temporal change in a signal value representing a result determined by a signal measurement/comparison determination circuit 90. The signal measurement/comparison determination circuit 90 performs comparison determination on the measurement result in the time chart illustrated in FIG. 3, but the electronic control unit 10 may perform comparison determination. The measurement method of each measured input signal is the same as that in FIG. 3, but in this case, it is necessary to store, in the register, the measurement result of each measured input signal for each pulse. Therefore, an arithmetic circuit for performing the comparison determination and a register for storing the determination result are not required, but a register for storing the measurement result such as a response delay time; an injection control time, and an energization time is additionally required.

Regarding the response delay time, the measurement result is stored in the numbered register every time a time from a rise of an injection control signal 61 to a rise of an energization identification signal 81 is measured. When due to the abnormality in a drive device 20, the rise of the energization identification signal 81 exceeds an allowable delay threshold of the response delay time with respect to the injection control signal 61, the measurement time at the time of reaching the exceeded time or the maximum response delay measurement time is stored in the register.

The injection control time of the injection control signal 61 for each pulse and the energization time of the energization identification signal 81 for each pulse are also stored in the numbered register every time the measurement is performed. When the rise of the energization identification signal 81 does not appear due to an abnormality in the drive device 20 even if it exceeds the allowable delay threshold of the response delay time and the injection control time corresponding to one pulse of the injection control signal 61 ends, it is considered that the energization does not occur, and the energization time may be stored as "0" in the register at a time at which the measurement of the injection control time is completed.

When a fall of the energization identification signal 81 does not appear due to fixation of an output 72 of the drive device 20 to a GND level or the like, the measurement of the energization time at the corresponding pulse of the energization identification signal 81 is completed at a time of reaching the maximum measurement time, and the energization time may be stored as the maximum measurement time in the register.

The electronic control unit 10 compares the injection control time and the energization time between the register data with the same number. Therefore, the injection control signal 61 and the energization identification signal 81 corresponding thereto are required to store the measurement result in the register with the same number. Specifically, when the energization identification signal 81 rises within the allowable delay threshold after the injection control signal 61 rises, both the energization identification signal 81 and the injection control signal 61 should be paired and stored in the register with the same number. Furthermore, it is preferable that depending on a transfer timing of the communication interface 50, the wrong determination is not made by transferring only the updated data together with data to be compared or adding a graph showing the data, so that a mismatch between the number of times of injection control and the number of times of energization or a mismatch between the injection control time and the energization time does not occur.

Regarding Modifications of Present Invention

The present invention is not limited to the above-described embodiments but includes various modifications. For example, the above-described embodiments have been described in detail for better understanding of the present invention and are not limited to the one including all the configurations described above. Further, a part of the configuration of one embodiment may be replaced with that of another embodiment, the configuration of one embodiment may be incorporated into the configuration of another embodiment. Further, a part of the configuration of each embodiment may be added, deleted, or replaced by that of a different configuration.

The electronic control unit 10 and the drive device 20 may share and perform the comparison determination for each measurement item. For example, it is considered that the drive device 20 may perform comparison determination on the response delay time or only perform measurement on the injection control time, the energization time, the number of times of injection control, and the number of times of energization, and transmits the results to the electronic control unit 10, and the like.

Each of the configurations, functions, processing sections, processing units, or the like described above may be partially or entirely realized in hardware, for example, by designing them by an integrated circuit. Further, each of the configurations, functions, or the like described above may also be realized by software in which a processor interprets a program for realizing respective functions and executing them. Information such as a program, a table, a file, or the like for realizing each of the functions may be provided in a recording device such as a memory, a hard disk, or a solid state drive (SSD), or may be provided in a recording medium such as an IC card, an SD card, or DVD. Further, control lines and information lines which are considered necessary in view of explanation are shown, and all of control lines and information lines are not always shown in view of products. It may be considered that substantially all of the configurations are actually connected to each other.

REFERENCE SIGNS LIST 10 electronic control unit
20 drive device
30 CPU
31 injection command
40 IO port
50 communication interface
56 measurement start trigger
60 input signal determination circuit
61 injection control signal
65 gate control circuit
70 switch element
71 gate input 72: output
80,85 comparator
81 energization identification signal
86 energization determination threshold voltage
87 first threshold voltage
88 second threshold voltage
90 signal measurement/comparison determination circuit
91 comparison determination result
100 fuel injection valve
200 DC power supply

The invention claimed is:

1. A load drive circuit comprising:
a switch element that drives a load;
a diagnosis unit that diagnoses an abnormality in responsiveness of the switch element based on a drive command of the switch element and a signal at an output terminal of the switch element; and
an energization identification signal generating unit that compares a voltage at the output terminal of the switch element and a predetermined voltage threshold to discriminate whether or not the switch element is in an energization state or a cut-off state and output an energization identification signal representing the discrimination result,
wherein the diagnosis unit uses the energization identification signal to diagnose at least any one of a delay time between the drive command and the energization identification signal, an energization time of the switch element, or the number of times of energization of the switch element.

2. The load drive circuit according to claim 1,
wherein the diagnosis unit uses the energization identification signal to diagnose the switch element and uses the energization identification signal to determine whether or not a ground fault of the load occurs.

3. The load drive circuit according to claim 2, wherein in a cut-off period in which the drive command instructs the switch element to be in a cut-off state, the diagnosis unit uses the energization identification signal to determine whether or not the ground fault of the load occurs, and
when it is determined that the ground fault of the load occurs in the cut-off period, the diagnosis unit determines that the switch element is abnormally energized.

4. The load drive circuit according to claim 1,
wherein the diagnosis unit uses the energization identification signal to diagnose the switch element and uses the energization identification signal to determine whether or not wiring for connecting the load drive circuit and the load is disconnected.

5. The load drive circuit according to claim 4, wherein in a cut-off period in which the drive command instructs the switch element to be in an energization state, the diagnosis unit uses the energization identification signal to determine whether or not the wiring is disconnected, and
when it is determined that the wiring is disconnected in the energization period, the diagnosis unit determines that the switch element is abnormally energized in a period in which the wiring is not disconnected in the energization period.

6. The load drive circuit according to claim 1, wherein the load is configured as an electric load that opens and closes a fuel injection valve that injects fuel to an internal combustion engine,
the drive command is a command for instructing the load to inject the fuel,
the drive command is a command for indicating an injection timing and an injection time of the fuel on the internal combustion engine in one combustion cycle, one or more times, and
the load drive circuit energizes the load so as to open and close the fuel injection valve according to the drive command.

7. The load drive circuit according to claim 6, further comprising a storage device that stores the diagnosis result obtained from the diagnosis unit,
wherein the diagnosis unit stores the diagnosis result in the storage device every time the drive command indicates the injection timing and the injection time.

8. A load drive system comprising:
the load drive circuit according to claim 1; and
an electronic control unit that transmits the drive command to the load drive circuit.

9. The load drive system according to claim 8, wherein the electronic control unit includes
a terminal that transmits the drive command to the load drive circuit, and
a communication interface that receives the diagnosis result obtained from the diagnosis unit from the load drive circuit.

10. The load drive circuit according to claim 1, further comprising:

a terminal that receives the drive command from an electronic control unit that transmits the drive command; and a communication interface that transmits and receives data to and from the electronic control unit, wherein the diagnosis unit transmits the diagnosis result to the electronic control unit through the communication interface.

11. The load drive circuit according to claim 1, further comprising:

a terminal that receives the drive command from an electronic control unit that transmits the drive command; and a communication interface that transmits and receives data to and from the electronic control unit, wherein the diagnosis unit transmits the diagnosis result obtained by using the energization identification signal to the electronic control unit through the communication interface.

12. The load drive circuit according to claim 1, wherein the diagnosis unit determines the number of times that the switch element is in an energization state, the diagnosis unit calculates a difference between the number of times that the drive command instructs the switch element to be in the energization state and the number of times that the switch element is in the energization state, and when the difference does not fall within a predetermined determination threshold, the diagnosis unit outputs an abnormal flag indicating that the difference does not fall within the predetermined determination threshold.

13. A load drive circuit comprising:

a switch element that drives a load; and a diagnosis unit that diagnoses an abnormality in responsiveness of the switch element based on a drive command of the switch element and a signal at an output terminal of the switch element, wherein after the drive command instructs the switch element to be in an energization state, the diagnosis unit determines whether or not a delay time until the switch element is in the energization state falls within a predetermined time window, and when the delay time does not fall within the time window, the diagnosis unit outputs an abnormal flag indicating that the delay time does not fall within the time window.

14. A load drive circuit comprising:

a switch element that drives a load; and a diagnosis unit that diagnoses an abnormality in responsiveness of the switch element based on a drive command of the switch element and a signal at an output terminal of the switch element, wherein the diagnosis unit determines a period in which the switch element is in an energization state, the diagnosis unit calculates a difference or ratio between a time when the drive command instructs the switch element to be in the energization state and a time when the switch element is in the energization state, and when the difference or ratio does not fall within a predetermined determination threshold, the diagnosis unit outputs an abnormal flag indicating that the difference or ratio does not fall within the predetermined determination threshold.

* * * * *